United States Patent [19]
McCann et al.

[11] Patent Number: 4,875,055
[45] Date of Patent: Oct. 17, 1989

[54] SIMPLIFIED MULTICOLOR FLUID SYSTEM FOR CONTINUOUS INK JET PRINTER

[75] Inventors: James D. McCann, Waynesville, Ohio; Lawrence R. Young, West Lebanon, N.H.; John M. Brandon, Dayton, Ohio

[73] Assignee: Eastman Kodak Company, Rochester, N.Y.

[21] Appl. No.: 273,549

[22] Filed: Nov. 21, 1988

[51] Int. Cl.[4] .......... G01D 15/18
[52] U.S. Cl. .......... 346/75; 346/140 R
[58] Field of Search .......... 346/75, 140 R

[56] References Cited

U.S. PATENT DOCUMENTS

| | | | |
|---|---|---|---|
| 4,042,937 | 8/1977 | Perry et al. | 346/1.1 |
| 4,314,264 | 2/1982 | Bok et al. | 346/140 |
| 4,591,875 | 5/1986 | McCann | 346/75 |
| 4,607,261 | 8/1986 | McCann | 346/75 |
| 4,614,948 | 9/1986 | Katerberg et al. | 346/75 |

*Primary Examiner*—H. Broome
*Assistant Examiner*—Gerald E. Preston
*Attorney, Agent, or Firm*—John D. Husser

[57] ABSTRACT

An improved construction for a continuous ink jet printing system of the kind having a chamber for receiving a plurality of ink cartridges, a plurality of ink supply sub-systems for delivering ink from the cartridges to respective print heads and a plurality of ink return sub-systems for returning ink from the print heads to respective cartridges. The cartridge chamber is constructed to be substantially air-tight and the ink cartridges have a vent opening to their interior. The chamber itself is coupled to a vacuum source and the cartridges in the chamber are maintained at the chamber pressure via their vent openings. The chamber evacuating source includes a source of compressed air and a venturi device coupled to the housing interior and the compressed air source. The compressed air source also can be coupled, via check valves structure, to provide drying air to the print heads.

4 Claims, 3 Drawing Sheets

SIMPLIFIED MULTICOLOR FLUID SYSTEM FOR CONTINUOUS INK JET PRINTER

FIELD OF INVENTION

The present invention relates to ink jet printers of the continuous type and more particularly to improved constructions for the fluid systems of such printers.

BACKGROUND ART

In continuous ink jet printer systems ink is supplied under pressure to the orifice cavity of a resonator body and ejects as continuous streams from an orifice plate aimed toward a print zone. The resonator body is vibrated to cause the ink streams to break up into uniformly sized and shaped droplets. A charge plate subsystem is located proximate the stream break-up point and droplets are selectively charged if intended to be non-printing ones. The charged, non-printing drops are deflected to a catcher subassembly which routes them back to the main ink supply. Uncharged drops pass on to the print zone.

U.S. Pat. Nos. 4,591,875; 4,607,261 and 4,614,948 describe continuous ink jet printers of the kind wherein a print head can traverse to and from the home station and along an operative print path. The '875 and '261 patents disclose fluid handling systems wherein ink reservoirs are constructed as readily replaceable cartridges that cooperate with fluid conduits of the printer in an easily connectible and disconnectible fashion.

By combining a plurality of printer systems such as described in the above-noted patents, printing can be effected with a corresponding plurality of different color inks. The fluid systems envisioned are completely duplicative, each different color fluid system having all the components of the others. This approach works well; however, the redundancy of components presents a fruitful area for ingenious cost-saving by joint usage of some components. Also that fluid system described in those patents presents challenges for improved compactness to the designer.

U.S. application Ser. No. 168,093, entitled "Modular Two-Color Fluid System For Continuous Ink Jet Printer", by Huliba et al, describes a modular two color printer approach wherein a single vacuum source is coupled to two different color ink cartridges to simplify the combined system. However, the ink cartridges of this system utilize six check-valved fluid connections, which can result in a high overall cartridge insertion actuation force (e.g. 25 pounds/cartridge). This necessitates a leveraging cartridge insertion system (e.g. with a ten-to-one mechanical advantage); and the resultant mechanical structure is space consuming and expensive. These printer systems also have required two separate air moving pumps, one for supplying cartridge vacuum and one for providing forced air for print head drying. This increases overall printer cost and reduces printer reliability.

SUMMARY OF THE INVENTION

One significant purpose of the present invention is to provide improved fluid handling systems for continuous ink jet printers to reduce the size and costs of such systems. The present invention has particular advantages in reducing the number of couplings to ink cartridges and in simplifying and combining air handling functions for multicolor printers. Another important advantage of the present invention is that its system cartridges do not need to withstand pressure differentials and thus can be made of thin and flexible materials. This further reduces system costs.

In one aspect the present invention constitutes an improved construction for a continuous ink jet printing system of the kind having a chamber for receiving a plurality of ink cartridges, a plurality of ink supply sub-systems for delivering ink from the cartridges to respective print heads and a plurality of ink return subsystems for returning ink from the print heads to respective cartridges. In the improved construction the cartridge chamber is substantially air-tight and the ink cartridges have a vent opening to their interior. The chamber itself is coupled to a vacuum source and the cartridges in the chamber are maintained at the chamber pressure via their vent openings.

In a related aspect the chamber evacuating source comprises a source of compressed air and a venturi device coupled to the housing interior and the compressed air source. The compressed air source is also coupled, via check valves structure, to provide drying air, under pressure, to the print heads.

BRIEF DESCRIPTION OF THE DRAWINGS

The subsequent description of preferred embodiments refers to the accompanying drawings wherein.

DETAILED DESCRIPTION OF PREFERRED EMBODIMENTS

Figure 1:
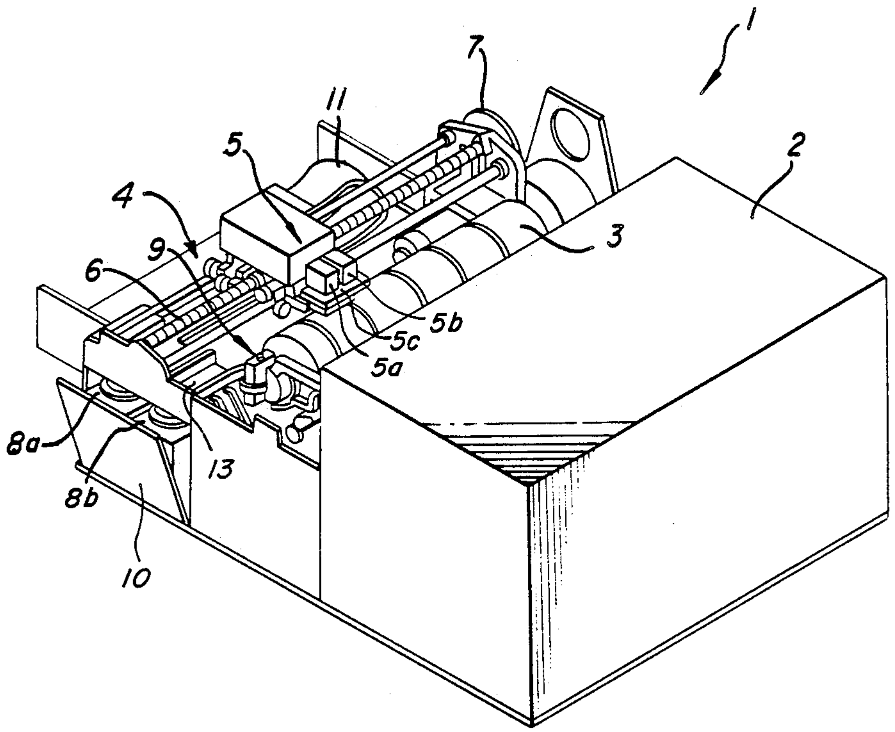
FIG. 1 is a perspective view of one printer apparatus in which the present invention is useful.

FIG. 1 illustrates an exemplary ink jet printing apparatus 1 employing one embodiment of the present invention. In general, the apparatus 1 comprises a paper feed and return sector 2 from which sheets are transported into and out of operative relation on printing cylinder 3. The detail structure of the sheet handling components does not constitute an essential part of the present invention and need not be described further.

Also illustrated generally in FIG. 1 is a print head assembly 5, which includes two or more print head modules **5*a*, 5*b* mounted in a nest 5*c* for movement on carriage assembly 6 by appropriate drive means 7. During printing operation the print head assembly is traversed across a print path in closely spaced relation to a print sheet which is rotating on cylinder 3. Ink is supplied to, and returned from, the print head modules by means of flexible conduits 11, which are coupled to an ink cartridge(s) 8*a*, 8*b*. A storage and start-up station 9 is constructed adjacent the left side (as viewed in FIG. 1) of the operative printing path of print head assembly 5. The drive means 7 and carriage assembly 6 are constructed to transport the print head assembly into operative relation with station 9 at appropriate sequences of the operative cycle of apparatus 1**.

In a preferred embodiment, the print head module **5*a*, 5*b* can be easily removed and inserted into nest 5*c*. The detail constructions of the print head assembly module and nest are described in U.S. application Ser. No. 168,094, entitled "Continuous Ink Jet Printer Having Modular Print Head Assembly" and filed Mar. 14, 1988 in the names of Bowling et al, which is incorporated herein by reference. In general, the print head modules each include an upper portion comprising a resonator body having piezoelectric transducer strips mounted thereon. Ink inlet and outlet tubes extending to and from openings in the sides of the body and the openings lead to an ink cavity that communicates with the orifice plate. The orifice plate is coupled to the body to direct ink droplet streams downwardly toward the print cylinder 3**. The detail construction of the resonator body and transducer can be as described in U.S. Pat. No. 4,646,104 and the orifice plate can be constructed as described in U.S. Pat. No. 4,184,925.

The print head assembly modules include a lower print head portion that includes a charge plate assembly and a droplet catcher. The detail construction of the charge plate can be as described in U.S. Pat. No. 4,560,991 and droplet catcher details can be as described, e.g. in U.S. Pat. Nos. 3,813,675; 4,035,811 or 4,268,836. Preferred techniques for interconnection of the charge plate on the catcher is described in U.S. Pat. No. 4,622,562. The printer housing has a door 10 which can be opened to remove and insert ink cartridges 8*a*, 8*b*. In accord with the present invention the housing also includes interior wall means 13 which define an airtight chamber for the cartridges when door 10 is closed.

Figure 2:
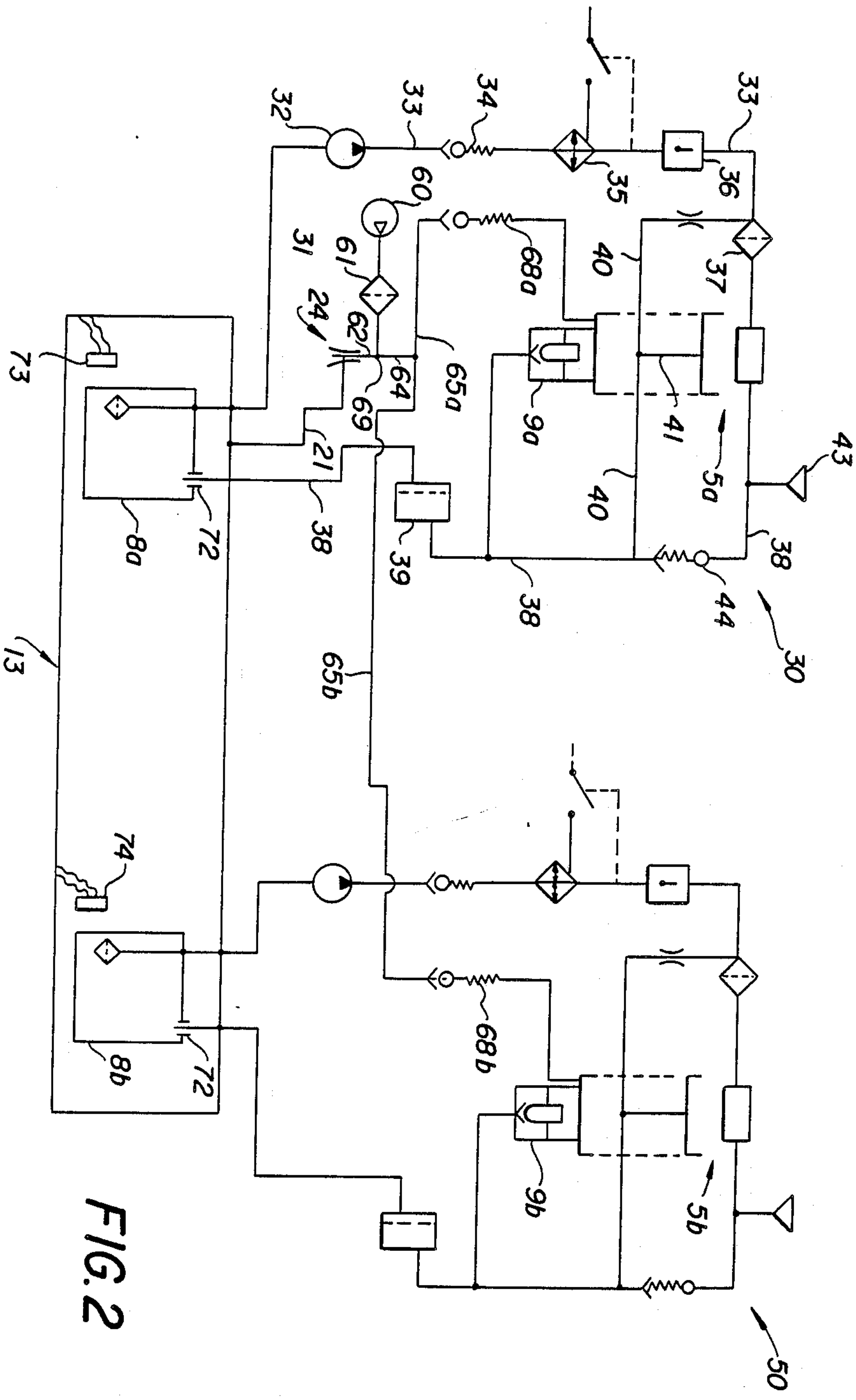
FIG. 2 is a diagram illustrating one multi-color fluid system for continuous ink jet printers in accordance with the present invention.

Referring now to FIG. 2, the print heads modules 5*a* and 5*b* and ink cartridges 8*a* and 8*b* are shown schematically in their operative relation in the two color fluid circulation system in accordance with one preferred embodiment of the present invention. In general, the overall fluid system comprises a separate ink circulation subsystems 30, 50 for each color print head. These two ink circulation systems can be substantially identical so that detail explanation of only subsystem 30 will be provided. Thus, ink pump 32 has an inlet line 31 coupled to cartridge 8*a* and a print head supply line 33 leads from the ink pump to print head 5*a*. Check valve 34, heater 35, temperature sensor 36 and main ink filter 37 are disposed in supply line 33. Ink return line 38 extends from the print head outlet side, through a defoam unit 39, into the ink cartridge 8*a*. A print head bypass line 40 extends from the filter 37 to return line 38, coupling on its bypass path to catcher outlet line 41. A pressure transducer 43 and a second check valve 44 are disposed in print head return line 38. A home station return line 45 joins the print head return line prior to defoam unit 39.

The ink circulation system just described cooperates, in accordance with the present invention, with a novel air flow subsystem in several desirable ways. Thus, in accord with the invention a single, variable-speed air compressor 60 is provided to: (i) supply a negative pressure to return ink to the cartridges 8*a*, 8*b* and (ii) supply drying air to dry the charge plate and catcher surfaces of print heads 5*a*, 5*b* (e.g. for start up and maintenance procedures such as described in detail in U.S. Pat. No. 4,623,897). The multispeed compressor 60 is coupled, through filter 61, to a juncture 69 from which a first vacuum-effecting line 62 extends to a venturi device 24. A second compressed air supply line 64 extends from juncture 69 to blow dry supply lines 65*a*, 65*b*, which in turn lead to home stations 9*a*, 9*b*.

Figure 3:
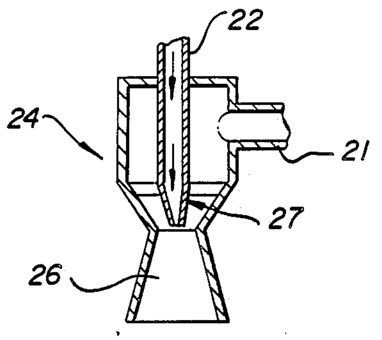
FIG. 3 is a enlarged cross-sectional view of the FIG. 2 venturi device.

The air to air venturi device 24 can be constructed as shown in FIG. 3 and includes an inlet tube 22 (from line 62) having a nozzle 27 which introduces high velocity air into venturi chamber 26. This produces a pumping effect that withdraws air into the venturi device from vacuum line 21. As shown in FIG. 3, chamber 26 discharges the combined air flows into the atmosphere. A check valve 68*a*, 68*b* is provided in each of the blow dry air lines leading to the home stations 9*a*, 9*b*.

In normal print operations of the printer, the compressor 60 is operated at a first nominal speed which is sufficient to provide adequate vacuum via line 21 to effect return of ink to the print cartridges, via line 38. When blow dry air is desired the compressor 60 is actuated to a second higher speed which opens check valves 68*a* and 68*b* and provides high pressure air to the home stations (still maintaining the vacuum effecting flow through line 21).

In accordance with another preferred aspect of the present invention, the vacuum line 21 is coupled to an cartridge air-tight housing 13, rather than to the individual ink cartridges 8*a*, 8*b*. The ink cartridges each have a vent opening 72 (which in the illustrated embodiment also receives the return ink). By providing a vacuum coupling to housing 13 rather than to each of the ink cartridges 8*a*, 8*b*, the cartridge construction can be simplified. In addition, the printer interface constructions are simplified, by using a single vacuum coupling to the housing 13 rather than to each cartridge (Note, this will be true even when there are more than two different color ink cartridges). In the illustrated embodiment, the housing 13 also includes external level sensors 73, 74 for cartridge 8*a*, 8*b* so that the cartridge need only have an ink supply and ink return opening. This further reduces the cartridge and printer interfacing constructions.

Figure 4:
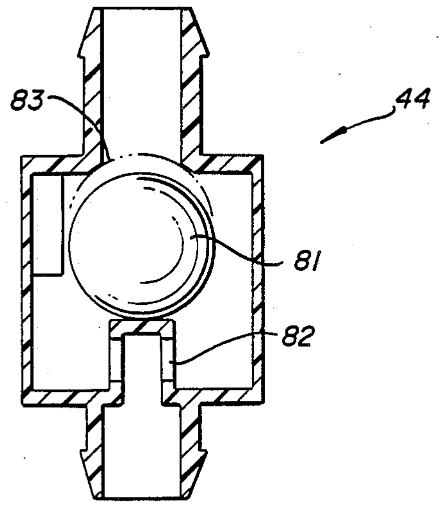
FIG. 4 is a cross-section of a pressure actuated mechanical value useful in the FIG. 2 fluid system.

FIG. 4 shows one other structure for simplifying the fluid system. In this construction, ink valve 44 is designed as a mechanical valve having inlet 82 and capture element 81, which lifts upwardly with increasing flow rate until it closes outlet 83. This allows cross flows through the print head up to about 100 ml/min and, after closure of the valve, provides an ink head print pressure of about 9.5 psi.

The invention has been described in detail with particular reference to certain preferred embodiments thereof, but it will be understood that variations and modifications can be effected within the spirit and scope of the invention.

I claim:

1. In continuous ink jet printing system of the kind having a housing means forming a chamber for receiving a plurality of ink cartridges, a plurality of ink supply means for delivering ink to respective print heads from said cartridges and a plurality of ink return means for returning ink respectively from said print head to said cartridges, the improvement wherein:

(a) said ink cartridges have a vent opening to said cartridge interior;

(b) said cartridge housing is substantially air-tight and includes means for evacuating said chamber.

2. The invention defined in claim 1 wherein said evacuating means comprises a source of compressed air and venturi means coupled to said housing interior and said compressed air source.

3. The invention defined in claim 2 wherein said compressed air source is coupled to said print head via check valve means.

4. The invention defined in claim 3 wherein said compressed air source is a variable speed compressor.

* * * * *